ALLEN P. ALGIER
ALFRED M. NELSON
HANS M. STERN
INVENTORS.

BY Smyth & Roston

ATTORNEYS.

March 13, 1962 A. P. ALGIER ET AL 3,024,982
CARD PROCESSING SYSTEM
Filed May 24, 1956 6 Sheets-Sheet 2

ALLEN P. ALGIER
ALFRED M. NELSON
HANS M. STERN
INVENTORS.

BY Smyth & Roston
ATTORNEYS.

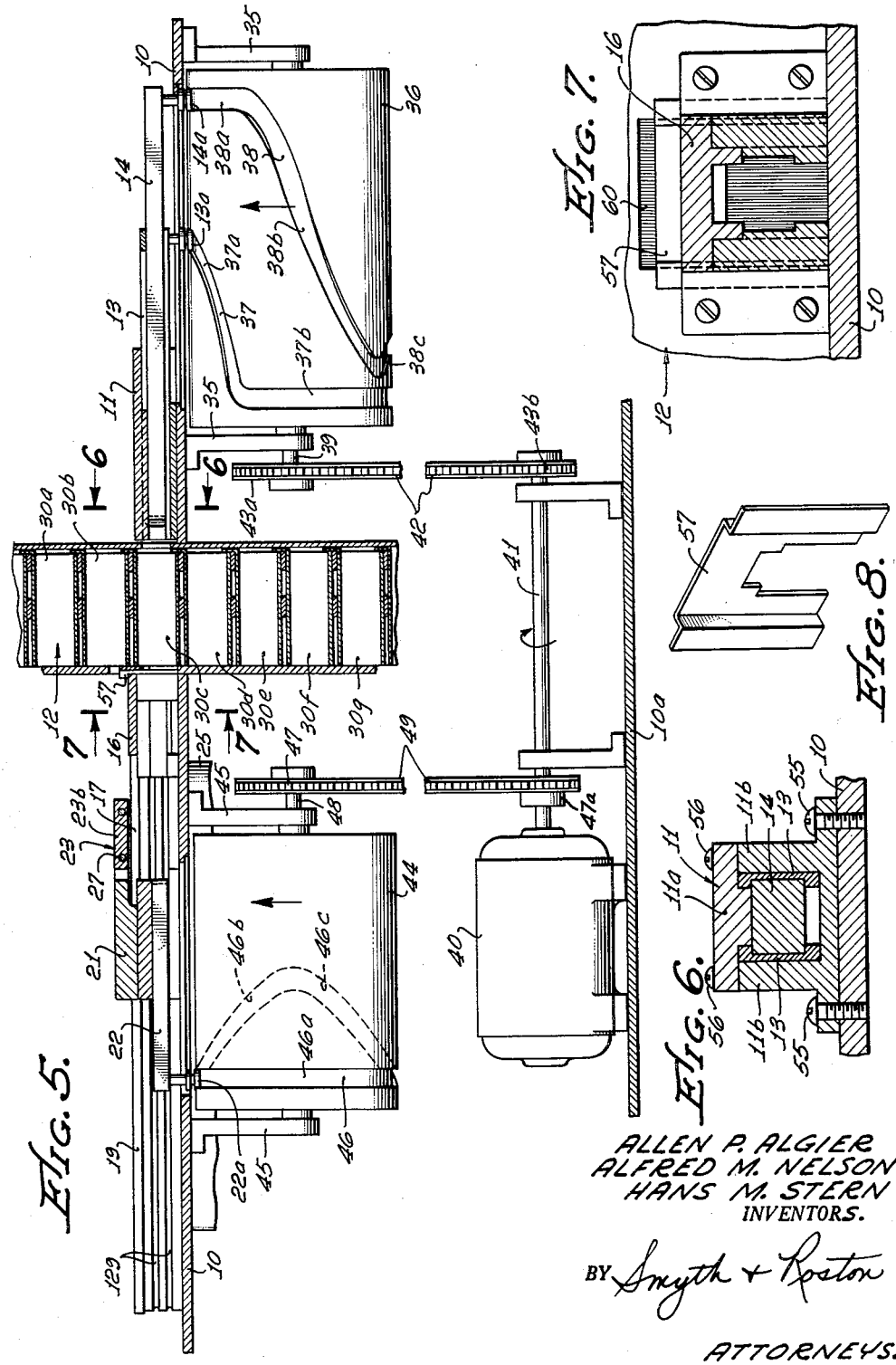

March 13, 1962 A. P. ALGIER ET AL 3,024,982
CARD PROCESSING SYSTEM
Filed May 24, 1956 6 Sheets-Sheet 4

ALLEN P. ALGIER
ALFRED M. NELSON
HANS M. STERN
INVENTORS.

BY Smyth & Roston
ATTORNEYS.

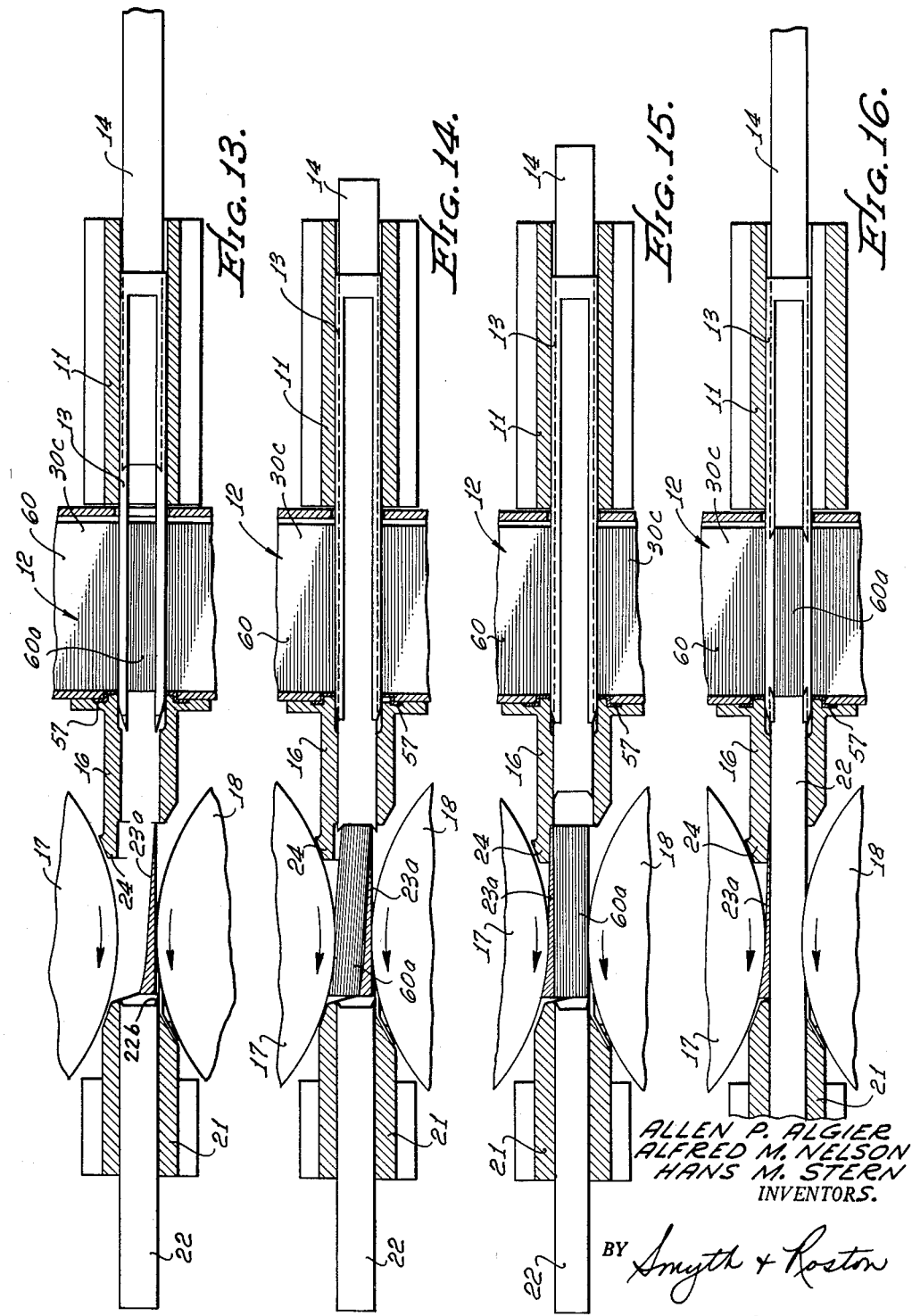

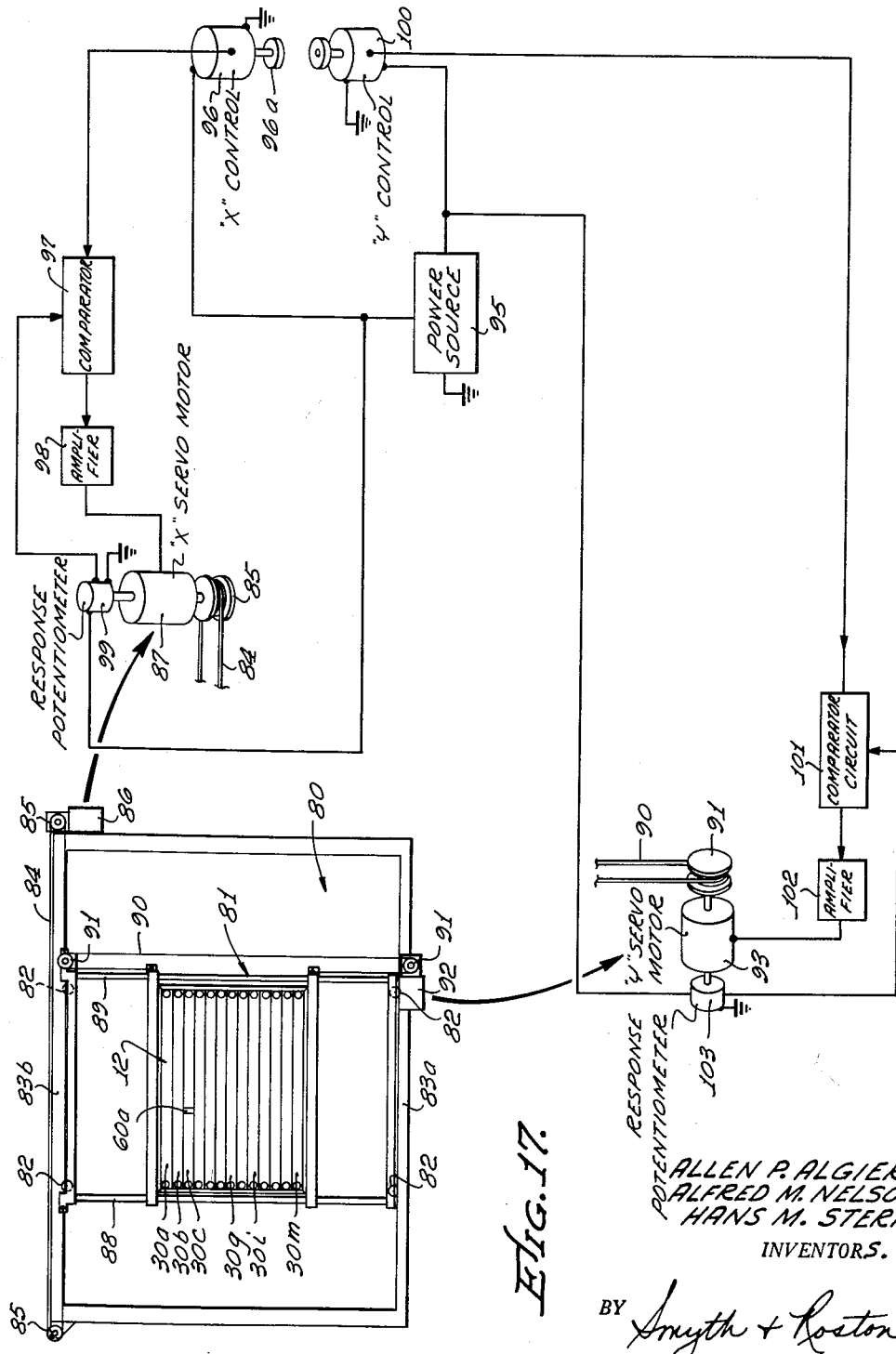

United States Patent Office 3,024,982
Patented Mar. 13, 1962

3,024,982
CARD PROCESSING SYSTEM
Allen P. Algier, Los Angeles, Alfred M. Nelson, Redondo Beach, and Hans M. Stern, Los Angeles, Calif., assignors to Magnavox Company, Los Angeles, Calif., a corporation of Delaware
Filed May 24, 1956, Ser. No. 587,055
25 Claims. (Cl. 235—61.11)

This invention relates to apparatus for processing stored information and more particularly to apparatus for selecting stored information and making it available for use in a data processing system.

The use of digital information in computers and in data processing systems has become increasingly prevalent in recent years. In computers, the information is used to solve complex mathematical problems, while in data processing systems the information serves a multitude of purposes for business operations. For example, data processing systems can be used for perpetual inventory control in department stores, for determining credit and other information in banks and for many other useful purposes. It is important in data processing systems that the stored information relating to each item of the operation in which it is used be rapidly available, even though millions of pieces or bits of information may be stored in the system.

It is apparent, therefore, that problems have been presented in obtaining a suitable system which includes means for selecting one or several bits of stored information from the millions of such bits stored in the system and for making this selection quickly and correctly. In one known type of system, the necessary information is stored on a series of stacked cards. The system includes means for removing the cards from the stack one-by-one and for presenting the cards sequentially to a sensing means. However, such a system is somewhat impractical when it is desired to store a large number of cards and when it is also desired to obtain information from any one of the cards without undue delay.

It is accordingly an object of the present invention to provide an improved apparatus for use in a data processing system, this apparatus being constructed to make information stored in a multiplicity of stacked cards available upon an individual basis and to do this quickly and efficiently. A feature of the invention is the provision of apparatus capable of selecting a group of cards from a magazine and transporting only the cards of the selected group sequentially past a processing means. With such apparatus, there is no need to pass all of the cards in the magazine past the processing means to obtain selected information therefrom.

In the drawings, which are to be regarded as merely illustrative:

FIGURE 5 is an enlarged sectional view substantially on the line 5—5 of FIGURE 1 and illustrates in further detail the magazine for holding a large plurality of cards and the selecting apparatus for removing a relatively small group of cards for introduction to the drum and for returning the cards to the magazine after circulation by the drums;

FIGURE 6 is an enlarged fragmentary sectional view substantially on the line 6—6 of FIGURE 5 and illustrates in further detail the construction of certain members for removing the particular group of cards from the magazine and for advancing the cards toward the drums;

FIGURE 7 is an enlarged fragmentary sectional view substantially on the line 7—7 of FIGURE 5 and illustrates in further detail the construction of certain members shown in FIGURE 6 and of a gate for controlling the removal of the particular group of cards from the magazine by the members and the advance of the cards toward the drums;

FIGURE 8 is a perspective view of the gate shown in FIGURE 7 as seen from a position above and to one side of the gate;

FIGURE 13 is an enlarged fragmentary top plan view, partly in section, of a pair of the drums, the magazine and important members of the selecting apparatus and illustrates the disposition of the members when the cards in the particular group are being selected from the magazine;

FIGURE 14 is an enlarged fragmentary top plan view of the members shown in FIGURE 13 and illustrates the disposition of these members and the cards in the particular group after the cards have been advanced to the drums for circulation by the drums;

FIGURE 15 is an enlarged fragmentary top plan view of the members shown in FIGURE 13 and illustrates the disposition of these members and the cards in the particular group after the cards have been circulated by the drums;

FIGURE 16 is an enlarged fragmentary top plan view of the members shown in FIGURE 13 and illustrates the disposition of these members and the cards in the particular group after the cards have been returned to their proper place in the magazine; and FIGURE 17 is a schematic representation of the electrical circuits and system for controlling the disposition of the magazine referred to above.

The invention provides apparatus for selecting individual groups of information storage cards from a magazine or stack and for processing the information on each card of the selected group. The apparatus includes a magazine for holding a plurality of such storage cards in a stacked condition. First means are controllable to remove a selected group of the cards from the magazine and to supply the cards to a carrier such as a group of rotatable drums. The carrier transports the cards of the selected group in sequence past a transducer which processes the information on each card. The carrier then reforms the processed cards and second means are actuated to return them to the original position of the group in the magazine. The apparatus also includes means for controlling the position of the magazine with respect to the first and second means so that any desired group of cards may be removed by the first means from the magazine and supplied to the carrier for processing.

Figure 1:
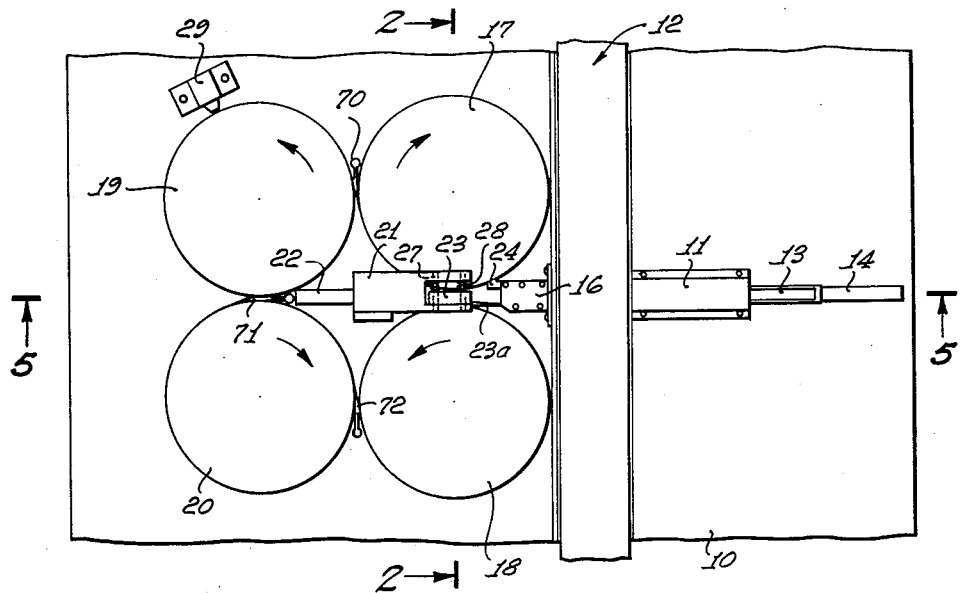
FIGURE 1 is a top plan view of the apparatus constituting this invention and includes a plurality of drums for recirculating information cards and selecting apparatus for removing a group of cards from a magazine, introducing the cards to the drums for processing and subsequently returning the cards to their proper position in the magazine.

With reference now to FIGURE 1, the apparatus of the present invention includes a supporting base 10 upon which is mounted a fixed channel member 11 which extends along the base. The channel member 11 terminates at a portion of the base which supports a magazine 12, which magazine will be described in detail hereinafter.

A movable spreader 13 is disposed within the channel member 11 for slidable movement on a reciprocal basis and is positioned to pass through the magazine 12. A push rod 14 is mounted for reciprocal motion within the spreader 13 and is positioned coaxially relative to the spreader so as to pass through the magazine 12. A guideway 16 is on the other side of the magazine 12 and is axially aligned with the channel member 11.

A first drum 17 is supported on the base 10 on one side of the longitudinal axis of the guideway 16. The drum 17 is shown as being rotatable in a clockwise direction about a vertical axis and may be of the type described and claimed in co-pending application Serial No. 505,248, filed May 2, 1955, by Alfred M. Nelson and Hans M. Stern and entitled "Card Processing Apparatus." A second drum 18 is mounted on the base 10 on the other side of the longitudinal axis of the guideway 16 and is shown as being rotatable in a counterclockwise direction about a vertical axis. The drum 18 may have the same construction as drum 17.

A further pair of drums 19 and 20 are also mounted on the base 10 for rotation about vertical axes. The drum 19 is rotatable in a counterclockwise direction and the drum 20 is rotable in a clockwise direction. The drum 19 is positioned so that it has a point on its periphery adjacent to a point on the periphery of drum 17 and another point on its periphery adjacent to a point on the periphery of drum 20. In like manner, drum 20 is positioned to have a point of its periphery adjacent to a point on the periphery of drum 18.

A suitable processing means such as a transducer 29 is operatively associated with drum 19. Transducer 29 may, for example, be a magnetic record or read head for storing or sensing magnetic information on the cards as they are carried in sequence past the transducer by drum 19. The transducer 29 is shown only by way of example since a plurality of transducing members may be included and may be associated with the different drums.

A gate 70 similar to the gates described in co-pending application Serial No. 505,248 is disposed between drums 17 and 19 to transfer cards from the drum 17 to the drum 19. Gates 71 and 72 similar to the gate 70 are disposed between drums 19 and 20 and between drums 20 and 18, respectively. Each of the gates 70, 71 and 72 may be provided with a finger which extends to a position contiguous to its pair of associated drums so as to obtain a physical transfer of cards from one of the associated drums to the other.

A fixed channel member 21 is mounted on base 10 in axial alignment with the guideway 16 and is disposed between the drums 17 and 18. A push rod 22 is slidably mounted in a channel portion of member 21 for reciprocal motion along the longitudinal axis thereof in a direction coaxial with guideway 16 and channel member 11. Channel member 21 supports a follower plate 23 as by a pair of guide rods 27 (best seen in FIGURE 2) which extend between opposite walls of the channel member. The follower plate 23 is spring loaded by helical springs 28 so as to be normally biased against the periphery of drum 18, the springs 28 being disposed on the guide rods 27. The follower plate 23 is constrained by the guide rods 27 and the springs 28 to move in a direction perpendicular to the longitudinal axis of channel member 21 and guideway 16.

Guideway 16 has a finger 24 (best seen in FIGURES 2 and 4 and in FIGURES 13 to 16, inclusive) formed integral with one side thereof. The finger 24 may be made from a conductive material or may be made from a non-conductive material coated with a conductive layer. The finger 24 is adapted to make electrical contact with a conductive portion of plate 23 as the latter is urged toward the periphery of drum 17 against the action of springs 28.

Figure 2:
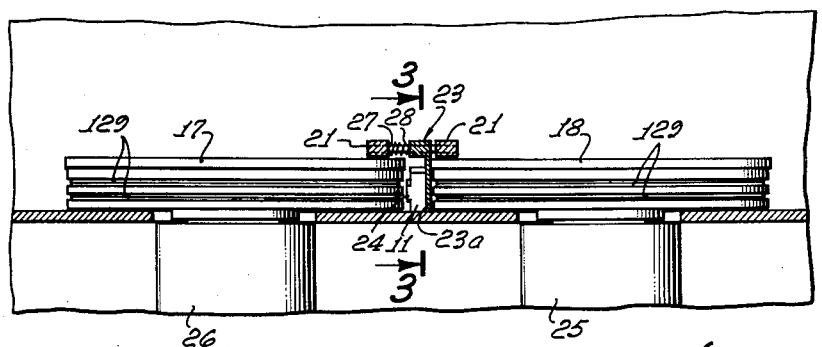
FIGURE 2 is an enlarged fragmentary sectional view substantially on the line 2—2 of FIGURE 1 and shows in further detail a pair of the drums and the apparatus for introducing the selected cards to the drums and subsequently receiving the cards from the drum.

As best shown in FIGURE 2 and as more fully described in co-pending application Serial No. 505,248, drums 17 and 18 have respective hollow shafts 26 and 25. The shafts 25 and 26 are connected to a suitable exhaust pump (not shown) which creates an air intake around the respective peripheries of the drums. The air intake results from slots 29 which are provided at the peripheries of the drums. The slots 29 communicate by passageways (not specifically shown) with the hollow shafts 25 and 26. By providing an air intake at the peripheries of the drums, flexible cards can be carried in fixed positioning on the peripheries of these drums, so as to be movable with the drums as the drums rotate.

Figure 3:
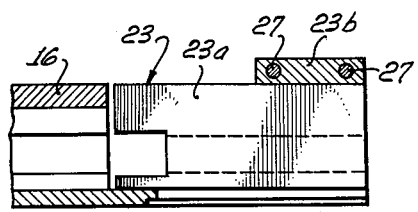
FIGURE 3 is an enlarged fragmentary sectional view substantially on the line 3—3 of FIGURE 2 and illustrates in further detail certain features of the selecting apparatus shown in FIGURES 1 and 2.

As more clearly shown in FIGURE 3, spring-loaded follower plate 23 has a blade portion 23a and a flange portion 23b. The blade portion 23a of the follower plate 23 has a tapered configuration as may be best seen in FIGURE 4. The blade portion 23a of the follower plate 23 tapers gradually toward the right in FIGURE 4 so that the thin end of the blade portion faces the cards in the magazine 12. The reason for this will be described in detail subsequently. The flange portion 23b on the plate 23 receives the transverse rods 27 extending between the opposite walls of the channel member 21.

Figure 4:
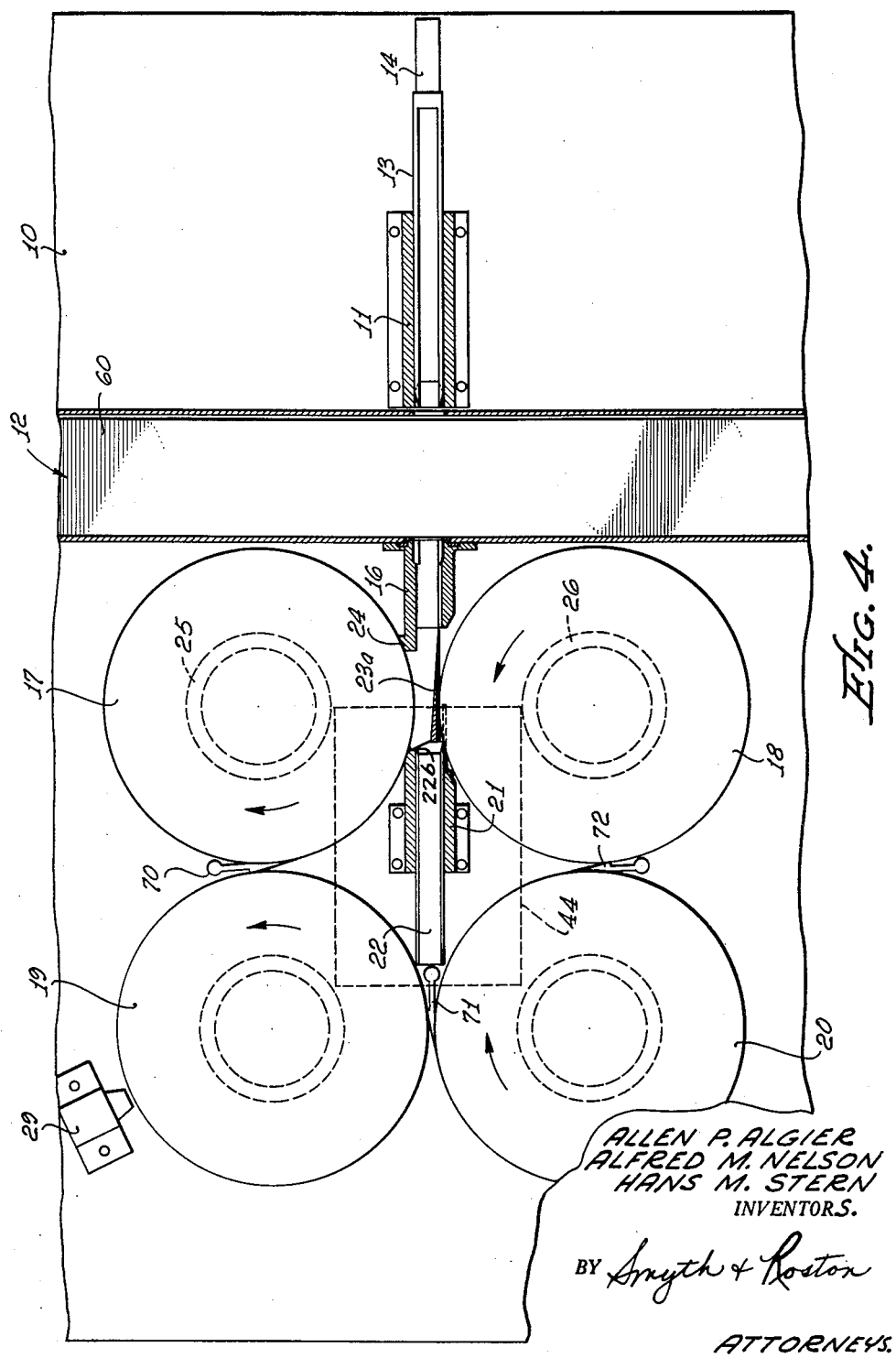
FIGURE 4 is an enlarged fragmentary top plan view, partly in section, of the apparatus shown in FIGURE 1 and shows the apparatus in position for introducing cards to the drums for recirculation by the drums.

The portions of the apparatus thus far described are shown on an enlarged basis in FIGURE 4. As shown in FIGURE 4, the magazine 12 supports a plurality of information storage cards in a stacked condition and in a manner to be fully described hereinafter. The cards may each be provided with a plurality of bits of information, preferably in magnetic form. The bits of information may be on a binary basis to represent different data by various combinations of bits. When each bit of information is in magnetic form on a binary basis, one polarity of magnetization may represent an indication of "0" and an opposite polarity of magnetization may represent an indication of "1."

The different bits of information on each card may be disposed in successive positions along each card in a lateral direction. This represents the direction in which the card is moved by the apparatus of this invention. The information may be disposed in a plurality of horizontal rows in a direction corresponding to the direction of card movement. The information in each row may be processed by a different transducing member corresponding to the member 29 so that a plurality of signals may be simultaneously read or recorded by the different transducing members.

As shown in FIGURE 5, the bottom of push rod 14 has a cam follower 14a projecting from one end thereof. Likewise, the bottom of spreader 13 has a cam follower 13a projecting from one end thereof. The underside of base 10 supports a pair of spaced brackets 35 which in turn rotatably support a cylindrical cam 36. The cam 36 is driven by a sprocket 43a through a drive shaft 39. A drive motor 40 is supported on a floor 10a below base 10 and is coupled to a drive shaft 41. Drive shaft 41 is in turn coupled to a sprocket 43b. A chain 42 extends in an endless fashion around the sprockets 43a and 43b to drive the cam 36 in accordance with the operation of the motor 40.

Cam follower 13a rides in a groove 37 which is inscribed on the surface of the cam 36. The groove 37 has a first portion 37a which extends axially toward the left in FIGURE 5 as it extends circumferentially. The groove 37 also has a second portion 37b which extends circumferentially with no axial component. The first and second portions of the groove 37 extend circumferentially through an angular distance of approximately 180 degrees. Other portions of the groove 37 having a shape corresponding to the first and second portions of the groove are provided in the hidden surface of the cam 36 in FIGURE 5. The hidden portions of the groove 37 communicate with the portion 37a so as to provide a continuous configuration for the groove.

Cam follower 14a rides in a groove 38 which also is inscribed on the surface of the cam 36. The groove 38 has a first portion 38a which extends circumferentially with no axial component. The portion 38a of the groove 38 occurs on the cam 36 at substantially the same circumferential position as the portion 37a of the groove 37. The groove 38 also has a second portion 38b which extends axially toward the left in FIGURE 5 as it extends circumferentially. The portion 38b of the groove 38 occurs on the cam 36 at substantially the same circumferential position as the portion 37b of the groove 37.

The groove 38 also has a third portion 38c of relatively small circumferential length. This portion extends axially toward the right as it extends circumferentially. The total angular length of the first, second and third portions of the groove 38 is approximately 180 degrees. Other portions of the groove 38 extend through the remaining angular length of approximately 180 degrees (hidden in FIGURE 5). These portions of the groove 38 communicate with the portion 38a so as to provide a continuous configuration for the groove.

The push rod 22 has a cam follower 22a mounted at one end thereof and projecting downwardly therefrom. This cam follower rides in a groove 46 which is inscribed in the surface of a cylindrical cam 44. The cam 44 is rotatably supported between a pair of brackets 45 mounted on the underside of base 10. The cam 44 is driven by a sprocket 47 through a drive shaft 48. The sprocket 47 is coupled to a sprocket 47a on the drive shaft 41 through a drive chain 49.

The groove 46 in the cam 44 extends circumferentially around the complete periphery of the cam. The groove 46 has a first portion 46a which extends circumferentially through a distance of approximately 180 degrees and has no axial component. The first portion 46a of the groove 46 corresponds in angular positioning on the cam 44 to the angular positioning of the portions 37a and 37b of the groove 37.

The groove 46 also has a second portion 46b which extends axially toward the right in FIGURE 5 as it extends circumferentially. A third portion 46c of the groove 46 extends axially toward the left as it extends circumferentially in FIGURE 5. The portion 46c of the groove 46 provides a communication between the first and second portions of the groove. The portions 46b and 46c of the groove 46 are shown in broken lines in FIGURE 5.

Magazine 12 is controllable so that it may be moved in a vertical direction to bring any one of its shelves 30a to 30g, inclusive, of FIGURE 5 into alignment with the spreader 13 and push rods 14 and 22. The magazine is also movable horizontally so that a selected group of the stacked cards in any one of the shelves 30a to 30g, inclusive, can be brought into alignment with the spreader 13 and the push rods 14 and 22.

As shown more clearly in FIGURE 6, the channel member 11 is fastened to the base 10 by means of suitable machine screws 55. The channel 11 is provided with a top cover 11a which is secured to sides 11b by suitable screws 56. The slidable spreader 13 is dimensioned to fit snugly within the channel 11. The push rod 14 is in turn disposed snugly within spreader 13 and is slidable relative to the spreader.

A gate 57 such as shown in FIGURES 5, 7 and 8 is positioned at the end of guideway 16 facing the magazine 12. The gate 57 is slidable in a vertical direction to control the removal of cards from the magazine 12 by the operation of the spreader 13 and the push rod 14. As shown in FIGURE 7, the gate 57 normally rests on the base 10. In this position, the gate 57 effectively blocks the entrance to the guideway 16 and assures that the stacked cards within the magazine 12 will not inadvertently fall into the mouth of the passageway. However, when the spreader 13 is advanced toward the left in FIGURE 5, the leading edge of the spreader engages the gate 57 and raises the gate sufficiently so that the cards selected by the spreader may be forced to enter the guideway 16.

Figure 9:
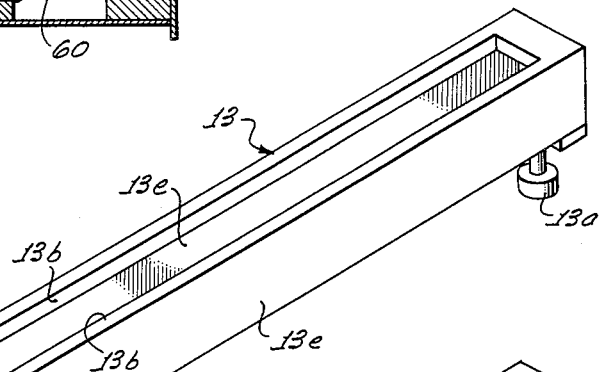
FIGURE 9 is an enlarged perspective view of a movable spreader shown in some of the previous figures for separating the particular group of cards from the other cards in the magazine so that the cards in the group can be subsequently removed from the magazine and advanced toward the drums.

The spreader 13 is shown in detail in FIGURE 9. The spreader 13 has a pair of spaced side walls 13e disposed in parallel relationship to each other. The side walls 13e, in turn, have portions 13b which extend inwardly toward each other from the tops of the side walls. As indicated at 13c, the lip portions taper downwardly in a rounded configuration at their forward end so as to engage the gate 57 and push the gate upwardly when the spreader is moved to the left in FIGURES 4 and 9.

Knife portions 13d extend longitudinally from the side walls 13e at one end of the walls at a position near the bottom of the walls. The knife portions 13d taper inwardly as they extend from the side walls so as to have relatively sharp edges at their extremities. As will be described in detail subsequently, the knife portions 13d extend at particular times into the magazine 12 to separate a particular group of cards from other cards in the magazine. The forward ends of the walls 13e, adjacent knife portions 13d, are also each brought to a sharp edge, as shown, to aid in this separation of the particular group of cards.

Figure 10:
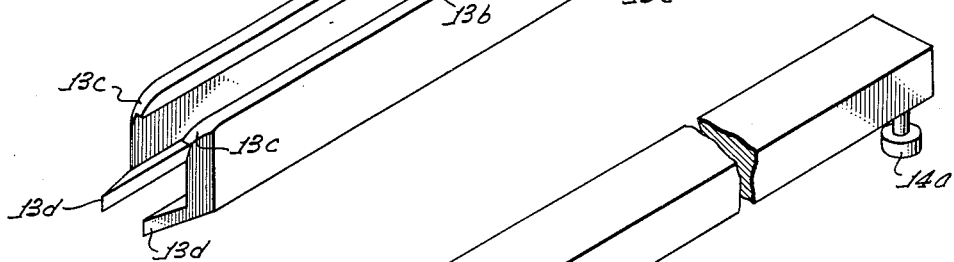
FIGURE 10 is an enlarged perspective view of a push rod which is movable to advance the cards in the particular group toward the drums after the cards have been isolated in the magazine by the spreader shown in FIGURE 9.

The push rod 14 is shown in FIGURE 10 as having a substantially rectangular configuration. As previously noted, the push rod 14 slides within the spreader 13. The left end of the push rod 14 in FIGURES 4 and 10 has a pair of spaced guide flanges 14b which taper outwardly as they extend from the push rod so as to have substantially a knife edge at their extremities. By including the guide flanges 14b, the cards isolated by the spreader 13 are able to be embraced within these flanges of the push rod 14. The cards are then able to be removed from the magazine 12 and carried into and through the guideway 16 as the push rod 14 is moved to the left in FIGURES 4 and 9. Guide flanges 22b are also provided on the push rod 22 at the right end of the push rod in FIGURES 4 and 13. The guide flanges 22b have configurations corresponding to the shapes of the guide flanges 14b on the push rod 14.

Figure 11:
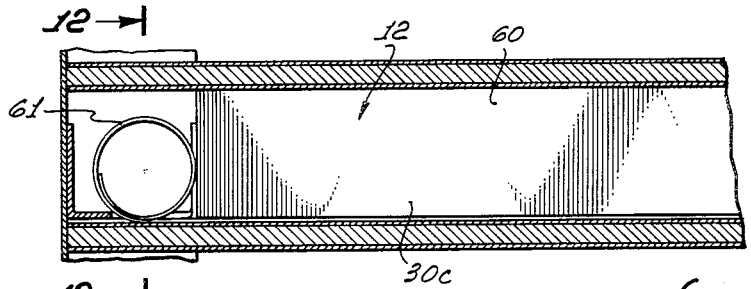
FIGURE 11 is an enlarged fragmentary sectional view in elevation of a portion of the magazine used for stacking the cards in the apparatus of the invention, as seen from a position in back of the cards.
Figure 12:
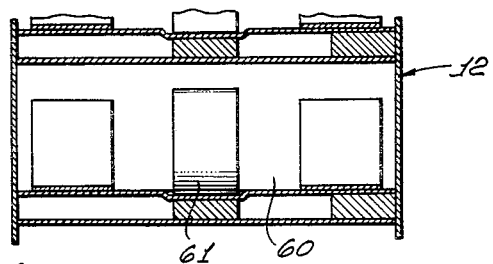
FIGURE 12 is an enlarged fragmentary sectional view substantially on the line 12—12 of FIGURE 11 and illustrates the construction of certain features in the magazine in further detail.

The cards are stacked along each shelf of the magazine 12 in the manner shown in FIGURE 11, which shows one shelf of the magazine by way of illustration. A plurality of cards 60 are supported on the base of each shelf such as the shelf 30c in substantially parallel relationship to each other. The cards 60 extend upwardly from the shelves so as to be disposed in a substantially vertical plane. The front of each card is disposed at the left end of the supporting shelf in FIGURES 4 and 12 and the rear end of the card is disposed at the right end of the shelf in these figures. The cards are held in stacked condition by looped resilient springs 61 disposed at one or both ends of the shelf. The springs 61 may be looped through a plurality of complete turns so as to become unwound as additional cards are added to the shelf. The springs 61 are advantageous since they apply a constant force to the cards to maintain the cards in a tight relationship regardless of the number of cards supported on the shelf.

The operation of the apparatus may best be understood by reference to FIGURES 13 to 16, inclusive. In FIGURE 13, the follower plate 23 is biased by the springs 28 (FIGURES 2 and 3) against the periphery of drum 18. As an initial step, the magazine 12 is actuated in a vertical direction in FIGURE 5 to bring shelf 30c into alignment with the spreader 13 and push rods 14 and 22. The magazine is also moved horizontally to bring a section of shelf 30c into alignment with the members 13, 14 and 22. Motor 40 (FIGURE 5) is then energized to rotate the cams 36 and 44.

As the motor 40 drives the cam 36, cam follower 13a moves in the portion 37a of the groove 37. As a result of this movement, the cam follower 13a drives the spreader 13 toward the left in FIGURE 5 to a forward position in the magazine 12. This causes the knife portions 13d of the spreader 13 (best seen in FIGURES 9 and 13) to extend into the shelf 30c and to act upon the cards in the shelf for a separation of a particular group of cards in the shelf from the other cards in the shelf. The separation of the particular cards in the group from the other cards is facilitated by the tapered configuration of the knife portions 13d.

As the spreader 13 is moved toward the left in FIGURES 4 and 13, the lip portions 13e of the spreader lift the gate 57 (FIGURES 7 and 8) upwardly so that the cards separated by the spreader can be removed from the magazine 12. While the spreader 13 is being moved to its forward position and the gate 57 is being opened, there is no movement of the push rod 14. The reason is that the cam follower 14a engages the groove portion 38a, which has no axial component.

Further rotation of the cam 36 brings the cam follower 13a of the spreader 13 into the portion 37b of the groove 37. The constant axial disposition of the groove portion 37b prevents any further forward motion from being imparted to the spreader 13. At the same time, the cam follower 14a of the push rod 14 engages the portion 38b of the groove 38. Because of the axial component provided in the groove portion 38b, the push rod 14 is moved toward the left from the position shown in FIGURE 13 to the position shown in FIGURE 14.

During the movement of the push rod from the position shown in FIGURE 13 to the position shown in FIGURE 14, the cards separated by the spreader 13 are pushed forward by the push rod through the guideway 16 and between the follower plate 23 and the periphery of drum 17. Only the particular cards isolated in the magazine 12 by the spreader 13 are moved through the guideway 16 by the push rod 14. The reason is that the particular cards are maintained in isolated relationship by the operation of the flange portions 14b on the push rod.

The movement of the cards to a position between the follower plate 23 and the periphery of the drum 17 is facilitated by the tapered configuration of the follower plate. By providing the follower plate 23 with a tapered configuration, the plate in effect serves as a wedge for insuring that the cards will be pressed against the periphery of the drum 17. This insures that the cards will become removed by the drum 17 in sequence from their position between the drum and the follower plate 23.

While the operations described above are taking place, the cam follower 22a (FIGURE 5) engages the portion 46a of groove 46 in the cam 44. Since the portion 46a of the groove 46 has no axial component, no motion is imparted to the push rod 22. This causes the push rod 22 to remain in its withdrawn position at the right end of the base 10, as shown in FIGURES 13 and 14. In this position, the push rod 22 is not able to interfere with the movements of the cards 60 into their proper position between the follower plate 23 and the drum 17.

After the cards have been advanced to their proper position between the drum 17 and the follower plate 23, the cam follower 14a engages the portion 38c of the grooves 38 shown at the bottom of the cam 36 in FIGURE 5. As the cam follower 14a moves along the groove portion 38c, the push rod 14 becomes slightly retracted toward the right from its extreme forward position to a position corresponding to that shown in FIGURE 15. By retracting the push rod 14 in this manner, the push rod cannot interfere with the transfer of cards to and from the drum 17. During the movement of the cam follower 14a along the groove portion 38c, the push rod 14 may be adapted to trip an electric switch (not shown) to de-energize the motor 40.

As previously described and as shown in the drawings, the drum 17 is rotating in a clockwise direction. This causes the drum 17 to remove the uppermost card of the group 60a in FIGURE 14 as the push rod 14 becomes retracted to the position shown in FIGURE 15. The card remains fixedly positioned on the periphery of the drum 17 because of the vacuum produced on the periphery of the drum such that the card is able to move toward the gate 70 in FIGURES 1 and 4 as the drum rotates. This card is transferred to the drum 19 (FIGURE 1) by the gate 70 since the gate has tapered fingers extending to a position contiguous to the peripheries of the drums 17 and 19, as described fully in co-pending application Serial No. 505,248.

The card is then carried around the periphery of drum 19 past the transducer 29, which senses information on the card or which may be used to record new or modified information on the card. After passing the transducer 29, the card is transferred to the periphery of drum 20 by gate 71 and from there to the periphery of drum 18 by gate 72. Drum 18 brings the card around to the other side of the follower plate 23.

The portion of channel member 21 adjacent the drum 17 is shaped and positioned relative to the drum 17 so as to permit only one card at a time to be withdrawn from the group 60a. Therefore, the cards in the stack 60a are transported by the drums 17, 19, 20 and 18 individually and in sequence past the transducer 29 and are subsequently re-formed in the same sequence on the side of follower plate 23 facing drum 18. As these cards are restacked on the side of follower plate 23 facing drum 18, the plate is urged by the re-stacked cards away from the periphery of the drum 18 and toward the periphery of drum 17. The cards are urged in this manner toward the drum 17 against the bias of the spring 28. This causes the cards to have the position shown in FIGURE 15 after all of the cards have been processed by the drums 17, 19, 20 and 18.

As the last card in the group 60a is withdrawn by the drum 17, the blade portion 23a of the follower plate 23 becomes positioned against the lip portion 24 of guideway 16. The blade portion 23a of the follower plate 23 is electrically conductive so as to close an electrical circuit when it contacts the lip portion 24 of the guideway 16. The closure of this electrical circuit again energizes motor 40 and causes the cams 36 and 44 once more to rotate. This subsequent rotation of cam 44 causes the cam follower 22a to ride in the portion 46b of groove 44 in FIGURE 5 so as to drive the push rod 22 toward the right in FIGURES 4 and 15. Such a movement of the push rod 22 causes it to move into the mouth of channel member 11 and return the group 60a to its original place in stack 60. This may be best seen in FIGURE 16.

At the same time that the cards in the group 60a are being returned to their original position in the stack 60, the cam follower 14a rides in the hidden portion of groove 38 in FIGURE 5 so as to retract push rod 14. After push rod 22 reaches its forward position as shown in FIGURE 16, the cam follower 13a rides in a hidden portion of groove 37 in FIGURE 5 to return the spreader 13 to its retracted position out of the magazine 12. Cam follower 22a simultaneously rides in portion 46c of groove 46 to return the push rod 22 to the retracted position of the push rod shown in FIGURES 13, 14 and 15. Push rod 22 can be made to trip a switch at this time so as to again de-energize motor 40. The magazine 12 can now be moved to bring another group of cards in any of its shelves into alignment with the spreader 13 and push rods 14 and 22 for selection by these members.

The control apparatus of FIGURE 17 is suitable to enable an operator to move the magazine 12 to any desired position so that any particular group of cards can be selected from the magazine for successive processing by the drums 17, 19, 20 and 18 and by the transducing members such as the member 29. It is to be understood that the apparatus illustrated in FIGURE 17 is representative only of one suitable means for controlling the position of magazine 12. Other known positioning means can be used. For example, a digital feedback mechanism to rotate a shaft on a digital basis can be used for this purpose. The rotation of the shaft can be converted to a linear motion of the magazine 12 as by a rack-and-pinion arrangement.

In the apparatus of FIGURE 17, the magazine 12 is mounted on a support frame 80 for movement in a horizontal or "X" direction and for movement in a vertical or "Y" direction. This is achieved by mounting the magazine in a carriage 81 within the frame 80. The carriage 81 has a series of rollers 82 which move in parallel tracks 83a and 83b constituting part of the frame 80. The carriage 81 may be moved reciprocally in a horizontal direction in the tracks 83a and 83b by a drive arrangement which includes a cord 84 looped around a pair of pulleys 85.

The pulleys 85 are rotatably mounted at opposite ends of the frame 80, with the opposite ends of the cord 84 being fixed to the carriage 81 at spaced positions on the carriage. The pulleys 85 are disposed substantially the same vertical level at positions near the top of the frame 80. The pulleys 85 may be rotated in either direction by the operation of means indicated in block form at 86 in FIGURE 17. These means include a servo motor 87 which is shown schematically in FIGURE 17 as being coupled mechanically to one of the pulleys 85.

Vertical motion of the magazine 12 is obtained by slidably mounting the magazine on a pair of spaced guide bars 88 and 89 vertically disposed in parallel relationship to each other to constitute side members of the carriage 81. The magazine 12 is movable up and down along the guide bars 88 and 89 by means of a cord 90 which is looped around a pair of pulleys 91 mounted at the bottom and top of the carriage 81 in a substantially vertical plane. The opposite ends of the cord 90 are attached to the carriage 81 at spaced positions on the carriage. The pulley 91 is rotatable in either direction by the operation of means indicated in block form at 92 in FIGURE 17. These means include a servo motor 93 for moving the magazine in a vertical direction.

When the servo motor 87 becomes energized, it operates to drive the magazine 12 in a horizontal or "X" direction toward the left or right in FIGURE 17. The motor 87 operates to move the magazine 12 in this manner by rotating the pulleys 85 so as to produce a displacement of the cord 84. Similarly, the motor 93 operates when energized to move the magazine 12 upwardly or downwardly in a vertical or "Y" direction by driving the pulleys 91 to produce a displacement of the cord 90. Therefore, by properly energizing the motors 87 and 93, any particular group of cards in any one of the shelves in the magazine 12 can be brought into alignment with the push rods 14 and 22 and the spreader 13 to be processed in the manner described above. For example, a group of cards 60a in shelf 30c of the magazine 12 can be brought into alignment so that only the cards of this particular group are selected and processed in the apparatus.

A convenient way of controlling the motors 87 and 93 is to connect each of them in a closed servo loop. When this is done, any particular "X" or "Y" position can be obtained by setting a calibrated manual control for each position to the proper value. For such an arrangement, a power source 95 is connected to one stationary contact of a potentiometer 96 having its other stationary contact grounded. The movable contact of the potentiometer 96 is manually adjustable by a control knob 96a. The movable contact of the potentiometer 96 is electrically connected to an input terminal of a comparator 97.

Another input terminal of the comparator circuit 97 is connected to the movable contact of a response potentiometer 99 having one stationary contact grounded and the other stationary contact connected to the same terminal of the power source as the potentiometer 96. The movable contact of the potentiometer 99 is mechanically coupled to the motor 87 for rotation in accordance with the operation of the motor. The operation of the motor 87 is controlled by signals introduced to the motor through an amplifier 98 from the output terminal of the comparator 97.

In like manner, a potentiometer 100, a comparator 101, an amplifier 102 and a potentiometer 103 are electrically associated with one another to control the operation of the servo motor 93. The potentiometer 100, the comparator 101, the amplifier 102 and the potentiometer 103 may be provided with characteristics similar to those respectively provided for the potentiometer 96, the comparator 97, the amplifier 98 and the potentiometer 99 and may be associated with one another in a similar manner.

Since the operation of the servo circuit 84 described above is understood by persons skilled in the art, a brief explanation of operation should be sufficient. The "X" control potentiometer 96 may be set to any desired position by manual adjustment of the knob 96a. This causes the voltage on the movable contact of the potentiometer 96 to become correspondingly varied so as to produce an unbalance between this voltage and the voltage on the movable contact of the potentiometer 99.

Because of the unbalance in voltages from the potentiometers 96 and 99, a signal representing the unbalance is produced by the comparator 97. This signal causes the motor 87 to turn until the voltage on the movable contact of the potentiometer 99 becomes equal to the voltage introduced to the comparator 97 from the movable contact of the potentiometer 99. This prevents any signal from being introduced to the motor 87 to drive the motor. Since the magazine 12 becomes moved by the operation of the motor 87, the magazine becomes adjusted to the desired position in the horizontal direction. Likewise, the "Y" control potentiometer 100 can be set to a selected position to produce a corresponding rotation of the "Y" servo motor 93 by a desired amount for an adjustment of the magazine 12 in the vertical direction.

Therefore, in the manner described above, the magazine 12 can be aligned to any shelf and to any selected position on such shelf merely by the manipulation of the potentiometers 96 and 100.

It should be appreciated that the particular type of magazine 12 shown in the drawings and described above is only illustrative. For example, a rotary type of magazine can also be used. Such a magazine can be adjusted in position by rotating it and moving it axially so that any desired group of cards can be selected from the magazine.

It should also be appreciated, and as noted previously herein, that the particular servo control described above is illustrative and that others can be used. For example, servo controls are known in which any desired co-ordinate position can be achieved by the manipulation of a single dial calibrated to correspond to the various desired topics.

The invention provides, therefore, apparatus which enables a vast number of information storage cards to be filed in a stack and yet be readily available for sequential processing. This is achieved by selecting a group of cards from the stack and sequentially processing only the cards of the selected group rather than attempting to sense all the cards in the stack. After the cards in the group have been selected, the cards are moved to a plurality of rotary drums for circulation with the drums and for processing of the cards during such circulation. The cards are then returned to their proper position in the stack.

It should be appreciated that the term "transport means" is intended to include drums as well as any other type of conveyors for the cards. It should also be appreciated that the term "cards" or "element" is intended to include any type of discrete elements capable of storing a plurality of bits of information.

What is claimed is:

1. Apparatus for selecting individual groups of information storage cards from a stack and for processing cards of a selected group, including, a magazine for holding a plurality of such information storage cards to provide a stack thereof, a first push rod mounted for reciprocal motion and positioned to pass through said magazine and remove a selected group of cards therefrom, transducer means, a carrier operative upon the cards in the selected group for obtaining a movement of cards of the selected group in sequence past said transducer means and for obtaining a regrouping of the transported cards, a second push rod mounted for reciprocal motion and positioned to be axially aligned with said first push rod to return the reformed group of cards to said magazine, and means for controlling the position of said magazine with respect to said first and second push rods so that different groups of cards may be individually supplied by said first push rod to said carrier.

2. Apparatus for selecting individual groups of information storage cards from a stack and for processing each card of a selected group, including, a magazine for holding a plurality of such information storage cards to provide a stack thereof, a spreader mounted for reciprocal motion and positioned to pass through said magazine and select a group of cards therein, a first push rod mounted for reciprocal motion and positioned coaxially within said spreader to pass through said magazine and remove therefrom the group of cards selected by said spreader, transducer means, a carrier operative upon the cards in the selected group for obtaining a movement of cards of the selected group in sequence past said transducer means and for obtaining a reforming of the cards in the group, a second push rod mounted for reciprocal motion and positioned to be axially aligned with said channel member and said first push rod to return the reformed group of cards to said magazine, means for driving said spreader and said first and second push rods in a predetermined sequence, and means for controlling the position of said magazine transversely of the longitudinal axis of said channel member and said first and second push rods so that different groups of cards may be individually selected by said channel member and supplied by said first push rod to said carrier.

3. The apparatus defined in claim 2 in which said driving means for said spreader and for said first and second push rods includes cam means for initially moving said spreader from a disengaged position to a position extending through said magazine, for then moving said first push rod from a disengaged position to a position extending through said magazine, and for subsequently moving said second push rod in a direction approaching said magazine.

4. The apparatus defined in claim 2 in which said magazine is mounted for motion in a plane perpendicular to the axis of reciprocal motion of said spreader member and of said first and second push rods, and said control means moves said magazine by respective amounts in mutually perpendicular directions in such plane in response to a predetermined setting thereof so that any desired group of cards in said magazine may be brought into position for selection by said spreader.

5. Apparatus for selecting individual groups of information storage cards and for processing each card of a selected group, including, a magazine for holding a plurality of such cards in stacked condition, selector means for removing a selected group of such cards from said magazine, means including a first rotatable drum for withdrawing the cards individually and in sequence from one end of the selected group, means including a plurality of additional rotatable drums for obtaining a controlled movement of the withdrawn cards around the drums and for reforming the selected group of cards, transducer means associated with said drums for processing the withdrawn cards, and means for returning the reformed group of cards to said magazine.

6. Apparatus for selecting individual groups of information storage cards and for processing each card of a selected group, including a magazine for holding a plurality of such information storage cards in a stacked condition, a spreader mounted for reciprocal motion and positioned to pass through said magazine and select a group of cards therein, a first push rod mounted for reciprocal motion and positioned coaxially in said spreader to pass through said magazine and remove therefrom the group of cards selected by said spreader, means including a first rotatable drum for withdrawing the cards individually and in sequence from one end of the selected group, means including a plurality of additional rotatable drums for obtaining a controlled movement of the withdrawn cards around the respective peripheries thereof and for reforming the selected group of cards, transducer means associated with said drums for processing the withdrawn cards, a second push rod mounted for reciprocal motion and positioned to be axially aligned with said spreader and said first push rod to return the reformed group of cards to said magazine, cam-operated driving means associated with said spreader and with said first and second push rods to impart selective reciprocal motion respectively thereto, and means for controlling the position of said magazine transversely of the longitudinal axis of said channel member and said first and second push rods so that different groups of cards may be individually selected by said channel members and removed by said first push rods.

7. In apparatus for selecting individual groups of information storage cards from a magazine and for processing the information on cards of a selective group, a spreader movable to a position within the magazine and shaped to isolate the cards in the individual group from the other cards in the magazine upon the movement of the spreader into the magazine, a first push rod slidable within the spreader to move the isolated cards to a position for processing of information on the cards, a second push rod slidably disposed to return cards isolated by the spreader to their proper position within the magazine, and means for driving the spreader and the first and second push rods to isolate the selective cards in the magazine, to advance the cards to the position for processing and to return cards isolated by the spreader to their proper position in the magazine after processing.

8. In apparatus for selecting individual groups of information storage cards from a magazine and for processing the information on each card of a selective group, a spreader slidable to a position within the magazine and having knife portions shaped to enter into the magazine and isolate the cards in the selective group from the other cards in the magazine, a first push rod slidable within the spreader to a position past the magazine and having flange portions for receiving the cards isolated by the spreader and for embracing the cards during the advance of the cards to a position for the processing of information on the cards, a second push rod disposed on the opposite side of the magazine from the first push rod and slidable to the magazine and having flange portions for embracing the cards to move the cards to the proper position within the magazine, and means including a motor and cam means for initially advancing the spreader into the magazine, for subsequently advancing the first push rod into the magazine and past the magazine to move the cards to the processing position, and for then advancing the second push rod toward the magazine and for retracting the spreader and the first push rod to return the cards to their proper position in the magazine.

9. In apparatus for selecting individual groups of information storage cards from a magazine and for processing the information on cards of a selective group, means including first and second drums rotatable to circulate cards for the processing of the information on the cards during such circulation, means for withdrawing the cards in the selective group from the stack and for advancing the cards to a position between the first and second drums for transfer in sequence to the drums, and a follower plate initially positioned to provide for a movement of cards in the selective group to a position contiguous to the first drum for withdrawal by the first drum and movable toward the first drum during the circulation of cards with the drums to provide for a proper stacking of the cards upon the circulation of the cards with the drums.

10. In apparatus for selecting individual groups of information storage cards from a magazine and for processing the information on each card of a selective group, means including first and second drums rotatable to provide a withdrawal by the first drum of cards disposed between the first and second drums and a circulation of cards to successive drums and a return of the cards by the second drum to a position between the first and second drums, means for advancing the cards in the selective group to a position between the first and second drums for the withdrawal of the cards in sequence by the first drum, a follower plate normally biased to a position contiguous to the second drum and movable from the second drum toward the first drum upon the return of the cards by the second drum to a position between the first and second drums, the follower plate having a wedged configuration to faciiltate the movement of the cards in the selective group to a position between the first and second drums and the subsequent transfer of the cards to the first drum, and means for returning the cards to their proper position in the magazine upon the recirculation of the cards with the drums.

11. Apparatus for selecting individual groups of information storage cards from a stack and for processing each card of a selected group including, a magazine for holding a plurality of such information storage cards to provide a stack thereof, a spreader mounted for reciprocal motion and positioned to pass through said magazine and to select a group of cards in the magazine in accordance with the positioning of the magazine, a first push rod mounted for reciprocal motion and positioned coaxially within said spreader to pass through said magazine and having flange portions for receiving the cards isolated by the spreader and for embracing the cards during the advance of the cards with the push rod to a position for the processing of the information on the cards, transducer means, transport means movable in a closed loop for transporting cards of the selected group in sequence past said transducer means and for reforming the group, a second push rod mounted for reciprocal motion and positioned to be axially aligned with said spreader and said first push rod and having flange portions for embracing the cards to move the cards to the proper position within the magazine, means for controlling the position of said magazine transversely of the longitudinal axis of said spreader and said first and second push rods so that different groups of cards may be individually selected by said spreader and supplied by said first push rod to said carrier, means associated with the transport means to obtain a feeding of cards to the transport means after the movement of the cards from the magazine and movable in accordance with the feeding of the cards to the transport means to provide for a reforming of the cards in the group, and means including a motor and cam means for initially obtaining an advance of the spreader into the magazine, for subsequently obtaining an advance of the first push rod into the magazine to move the cards to the processing position, and for subsequently advancing the second push rod toward the magazine after the processing and reforming of the cards in the group and for retracting the spreader and the first push rod to return the cards to their proper position in the magazine.

12. Apparatus as set forth in claim 11 in which the transport means includes a plurality of rotatable drums paired to obtain a transfer of cards between the different drums and in which the card-reforming means includes a follower plate normally biased to a position contiguous to the second drum in the plurality and movable from the second drum toward the first drum upon the feeding of cards to the first drum and the return of cards to the second drum and in which the follower plate has a wedged configuration to facilitate the movement of the cards in the selective group to a position between the first and second drums and the subsequent transfer of the cards to the first drum and in which the spreader is provided with knife edges to isolate the cards in the selected group from the other cards in the magazine.

13. Apparatus for selecting an individual group of information storage elements from a plurality of such elements, said selected group being defined by elements from any portion of the plurality of such elements, and for processing elements of the selected group where the number of elements in the selected group is less than the number of elements in the plurality, including, means including first and second spaced walls for storing the elements in the plurality between the first and second spaced walls; means operative upon the elements in the selected groups for removing such elements from the space between the first and second walls of the storing means; transducer means disposed relative to the elements in the selected group, upon the removal of the elements in the selected group from the space between the first and second walls of the storing means, for processing information on the elements of the selected group, and means operative upon the elements in the selected group for causing the elements of the selected group to move in sequence past the transducer means to obtain the processing of information on the storage elements.

14. Apparatus as set forth in claim 13 in which the element-moving means includes movable transport means constructed to produce a movement of the elements in accordance with the movements of the transport means.

15. Apparatus for selecting an individual group of information storage elements from a plurality of such elements, said selected group being defined by elements from any portion of the plurality of such elements, and for processing the elements of the selected group where the number of elements in the selected group is less than the number of elements in the plurality, including, a magazine including first and second spaced walls for holding the elements in the plurality in a stacked relationship between the first and second spaced walls, means operative upon the selected group of elements in the plurality in the magazine for removing the selected group of elements from the space between the first and second walls in the magazine, transducer means, means operative upon the elements in the selected group for causing the elements of the selected group to move in sequence past the transducer means for a processing of information on the elements and for regrouping the elements after the movement of the elements, and means operative upon the regrouped elements for returning the regrouped elements to the magazine.

16. Apparatus as set forth in claim 15 in which the element moving means includes a plurality of transport means each movable in closed loops and each disposed in paired relationship to other transport means to provide a transfer of cards between the transport means.

17. Apparatus for holding a plurality of information storage cards between a pair of spaced walls in a magazine and for processing the information on each card of a selected group from the cards in the plurality where the number of cards in the selected group is less than the number of cards in the plurality, means operative upon the cards in the plurality in the magazine for initially entering into the magazine and for isolating the cards in the selected group from the other cards in the plurality in the magazine, means operative upon the selected group of cards isolated in the magazine for subsequently withdrawing the selected group of cards from the magazine to a position for the processing of information on the cards, transport means disposed relative to the withdrawing means for obtaining a sequential movement of the cards withdrawn from the magazine, and means disposed relative to the cards on the transport means for processing information on the transport cards.

18. Apparatus for selecting an individual group of information storage cards from a magazine holding a plurality of such cards and for processing the information on each card of the selected group where the number of cards in the selected group is less than the number of cards in the plurality, means operative upon the cards in the plurality in the magazine for initially entering into the magazine and for isolating the cards in the selected group from the other cards in the plurality in the magazine, means operative upon the selected group of cards isolated in the magazine for subsequently withdrawing the isolated cards from the magazine, transport means operative upon the withdrawal of the selected group of cards from the magazine for obtaining a controlled movement of each card in sequence and for obtaining a regrouping of such cards after their movement, means disposed relative to the cards on the transport means for processing information on the transported cards, and means operative upon the regrouped cards for returning the cards to their proper position in the magazine.

19. Apparatus for selecting an individual group of information storage cards from a plurality of such cards, said selected group being defined by cards from any portion of the plurality of such cards, and for processing the cards of the selected group where the number of cards in the selected group is less than the number of cards in the plurality in the magazine, including, a magazine constructed to hold the information cards in the plurality in stacked relationship, means operative upon the cards in the magazine for withdrawing the cards in the selected group from the magazine, transport means disposed relative to the cards in the selected group upon the withdrawal of the cards from the magazine for obtaining a movement of the cards in sequence and for obtaining a return of the cards to the withdrawing means after such movement, transducing means disposed relative to the transported cards for processing particular information on such cards, and means responsive to the return of the transported cards to the withdrawing means for providing a controlled operation of the withdrawing means to obtain a return of the cards by the withdrawing means to the magazine for the disposition of the cards in stacked relationship in the magazine.

20. Apparatus for selecting an individual group of information storage cards from a plurality of such cards and for processing the cards of the selected group where the number of cards in the selected group is less than the number of cards in the plurality, including, a magazine constructed to hold the information storage cards in the plurality in stacked relationship, means normally displaced from the magazine and movable to a position relative to the cards in the magazine for operating upon the cards in the magazine to obtain the withdrawal of the cards in the selected group from the magazine and for subsequently operating upon the cards in the selected group to return the cards to the magazine at the position of withdrawal of the cards from the magazine, transport means disposed relative to the cards in the selected group upon the withdrawal of the cards in the selected group from the magazine for obtaining a movement of the cards in sequence from the withdrawn group and for subsequently returning the cards to the withdrawing means for disposition in stacked relationship, transducing means disposed relative to the transported cards for processing selected information on the cards, and means operatively coupled to the withdrawing means for controlling the movement of the withdrawing means to obtain in sequence a movement of the withdrawing means to the magazine, a movement of the withdrawing means from the magazine, a stationary disposition of the withdrawing means during the transport of the cards in the selected group and a return of the withdrawing means to the magazine after the transport of the cards for the re-insertion of the withdrawn cards into the magazine.

21. Apparatus for selecting an individual group of information storage elements from a plurality of such elements, said selected group being defined by elements from any portion of the plurality of such elements, and for processing elements of the selected group, where the number of elements in the selected group is less than the number of elements in the plurality, including card-holding means including first and second spaced walls for storing the elements in the plurality between the first and second spaced walls, means operative upon the elements in the selected group for removing such elements from the space between the first and second walls of the storing means, and means including transducer means disposed relative to the cards in the selected group upon their removal from the card-holding means for individually processing information on such cards.

22. Apparatus set forth in claim 21 in which means are responsive to the processing of information individually on the cards in the selected group for operating upon the removing means to obtain a return of the cards in the selected group by the removing means to the card-holding means.

23. Apparatus for processing elements of a group selected from a plurality of such elements where the number of cards in the selected group is less than the number of cards in the plurality and where the selected group is defined by cards from any portion of the plurality of such cards, including, transducer means for processing the elements of the selected group, means operative upon the elements in the selected group for causing the elements of the selected group to move in sequence past the transducer means for a processing of information on such elements, means including first and second spaced walls for storing the elements in the plurality between the first and second spaced walls, and means responsive to the processing of information on the elements in the selected group by the transducer means for obtaining a movement of such elements into the storing means to a particular position between the first and second spaced walls.

24. Apparatus for holding a plurality of information storage cards between a pair of spaced walls in a magazine and for processing the information on each card of a selected group obtained from the cards in the plurality and withdrawn from the magazine where such selected group is defined by cards from any portion of the plurality of such cards and where other cards in the plurality still remain in the magazine, including, transport means disposed relative to the cards in the selected group for obtaining a sequential movement of the cards withdrawn from the magaine, means disposed relative to the cards on the transport means for processing information on the transported cards, means responsive to the processing of information on the cards in the selected group for moving the cards to the magazine, and means responsive to the movement of the cards in the selected group to the magazine for initially entering into the magazine and for isolating the cards still remaining in the magazine and for obtaining a movement of the cards in the selected group into the isolated position in the magazine for storage with the other cards still remaining in the magazine.

25. Apparatus for selecting individual groups of information storage cards from a stack holding a plurality of such elements and for processing each card of the selected group, including, a magazine for holding the information storage cards in the plurality to provide a stack of such elements, first means operative upon the cards in the magazine for removing the selected group of such cards from said magazine, transducer means, a carrier operative upon the cards in the selected group for obtaining a movement of the cards of the selected group in sequence past said transducer means for a processing of information on the cards and for reforming the cards in the group, second means operative upon the cards in the reformed group for returning the cards in the reformed group to said magazine, and means for obtaining controlled variations in the position of said magazine with respect to said first and second means so that different groups of cards in the plurality may be individually removed by said first means and supplied to said carrier.

References Cited in the file of this patent

UNITED STATES PATENTS

| 1,865,074 | Baber | June 28, 1932 |
| 2,002,807 | Whitson | May 28, 1935 |
| 2,206,134 | Streyckmans | July 2, 1940 |
| 2,288,520 | Geller et al. | June 30, 1942 |
| 2,353,001 | Armbruster | July 4, 1944 |
| 2,814,440 | McWhirter et al. | Nov. 26, 1957 |

FOREIGN PATENTS

| 534,216 | Germany | Sept. 26, 1931 |